United States Patent Office 3,733,327
Patented May 15, 1973

3,733,327
CATALYTIC OXYDEHYDROGENATION OF ALKYL AROMATICS AND ALKYL PYRIDINES
G. Edwin Vrieland, Midland, Mich., and Henry Nelson Beck, Walnut Creek, Calif., assignors to The Dow Chemical Company, Midland, Mich.
No Drawing. Filed June 28, 1971, Ser. No. 157,722
Int. Cl. C07c 5/18; C07d 31/20
U.S. Cl. 260—290 V
17 Claims

ABSTRACT OF THE DISCLOSURE

Oxydehydrogenation of alkyl aromatic compounds including nitrogen heterocyclics having at least one $C_2$–$C_6$ alkyl side chain having at least one hydrogen atom on the carbon atom of the alkyl group attached to the aromatic ring and 1–2 rings, by passing a mixture of the alkyl aromatic compound and an oxygen containing gas over a cerium phosphate or cerium-zirconium phosphate catalyst at 400–650° C. converts said $C_2$–$C_6$ alkyl groups to alkene derivatives, with good selectivity and conversion.

BACKGROUND OF THE INVENTION

The conversion of $C_2$–$C_3$ alkyl monocyclic aromatic hydrocarbons, e.g., ethyl benzene, ethyl toluene, isopropylbenzene, and others to styrene or a substituted styrene by passing a mixture of the alkyl aromatic hydrocarbon and steam over a metal oxide catalyst, e.g., $Fe_2O_3$, has been practiced commercially for a number of years. Shortcomings of the procedure are the low conversions per pass, usually 35–40%, and comparatively high temperatures needed for the dehydrogenation.

Catalytic oxydehydrogenation of ethyl benzene to the corresponding styrenes, promoted with halogens or certain sulfur containing compounds are also known. These processes produce styrenes which are contaminated with halogenated organic or inorganic by-products, if a halogen is the promoter, or elemental sulfur, sulfur oxides or mercaptans, if sulfur-containing compounds are the promoters. The contaminants frequently cause serious problems insofar as purification of or their separation from the styrenes are concerned. In addition, both halogen and sulfur-compound promoted oxydehydrogenations form corrosive products and can contribute to ecological contamination.

Non-promoted oxydehydrogenation processes, using a wide variety of catalysts are also known. The majority of the disclosures show that if a mixture of an oxygen-containing gas and ethyl benzene, with steam in some instances and without steam in others, is passed over a heterogeneous catalyst the conversion of ethyl benzene is increased, but selectivity decreases, so that the gain in yield of styrene is of a low order.

British Patent 1,007,489 discloses the use of cerium oxide or zirconium oxide in admixture with one or more Group Ia or IIa oxides or hydroxides, for halogen activated oxydehydrogenation of certain hydrocarbons. The above patent teaches that ceric oxide alone is a poor catalyst in the reaction system.

U.S. Patent 3,115,532 discloses that a hydrogel made by reacting a water soluble cerium salt with an oxyacid of phosphorus or a salt thereof to provide a phosphorus to cerium ratio of 0.1 to 5.0, yields a superior catalyst for isomerizing $C_5$–$C_7$ hydrocarbons.

SUMMARY OF THE INVENTION

It has been found that if a mixture of oxygen and alkyl aromatic compounds including nitrogen heterocyclics having 2–6 carbon atoms in the alkyl group with at least one hydrogen atom on the carbon atom attached to the aromatic ring and from one to three such alkyl groups per molecule, one to two rings, which can have one or more halogen groups, one to two $CH_3$ groups, one to two cyano groups, or one to two t-butyl groups on one or both rings, in a molar ratio of from 0.5 to about 4 moles of oxygen per mole of aromatic compounds, is passed over a cerium phosphate, or a solid solution of or coprecipitate of cerium and zirconium phosphates in which the cerium phosphate content is at least 50 mole percent, at a temperature of from about 400 to about 650° C. and at a space velocity of from about 55 to about 2500, good conversions of the aromatic compounds to the corresponding alkene aromatics at high selectivities are obtained. Best conversions and selectivities are obtained with alkyl aromatic or ring halogenated alkyl aromatic hydrocarbons. The process can be carried out in the presence or absence of an inert diluent which can be nitrogen, carbon dioxide, a noble gas, or a mixture thereof with or without steam. The reaction can be effected at atmospheric, sub-atmospheric or elevated pressure.

DETAILED DESCRIPTION OF THE INVENTION

When alkyl aromatic compounds of the type described above and oxygen are passed over solid catalysts at elevated temperature two main competing reactions can occur; one is dehydrogenation and the second converts the alkyl groups to oxygenated derivatives. It is, therefore, unexpected to find that the catalysts above defined would have the high degree of specificity for dehydrogenation and the low conversion of the alkyl aromatics to oxygenated derivatives. It is even more surprising to find for the reaction a catalyst which will convert a

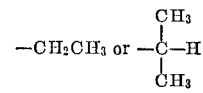

alkyl group to the corresponding vinyl group at high selectivity, even though the aromatic compound also contains a

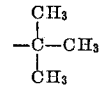

group.

A further unusual finding is that the conversion of the $C_2$–$C_6$ groups as defined, to the corresponding alkenyl group is effected at temperature of about 100° C. lower than the conventional non-oxidative dehydrogenations. This factor is quite important, because it is known that in commercial processes the dehydrogenation temperature of ethyl benzene is quite close to its decomposition temperature. Chlorostyrenes and t-butylstyrenes are usually prepared commercially by means other than direct dehydrogenation of the corresponding ethyl compounds, because temperatures at which significant dehydrogenation can occur are above their decomposition temperatures.

An object of this invention is the provision of a process for converting compounds containing at least one $C_2$–$C_6$ alkyl group, of the type defined, to an olefinic derivative by oxydehydrogenation.

Another object is a process for producing olefinically substituted aromatic compounds by oxydehydrogenation of the said precursor alkyl aromatic compounds with a catalyst containing from 50–100 mole percent of cerium phosphate and 0–50% zirconium phosphate.

Another object is a process for preparing olefinically substituted compounds having 1 to 2 rings, by passing a mixture of oxygen, an inert diluent and said aromatic compound containing at least one $C_2$–$C_6$ alkyl group, of the type defined above, over a cerium phosphate or a solid solution of or a coprecipitated cerium-zirconium phosphate catalyst at an elevated temperature, but considerably below the decomposition temperature of the alkyl aromatic compound or its dehydrogenated derivative.

The compounds which can be dehydrogenated are represented by the structure $(R_1)_xAr(R)_n$, wherein $n$ is an integer from 1 to 3, R is a $C_2$–$C_6$ alkyl group with at least one H atom on the alkyl carbon atom attached to the aromatic group, Ar is a mono or bicyclic, fused or nonfused, aromatic hydrocarbon group or a nitrogen-containing heterocyclic group, e.g.

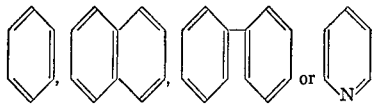

and $R_1$ represents $CH_3$, a halogen atom, —CN or —$C(CH_3)_3$ and $x$ is a number from 0 to 9, preferably 0 to 3. In the reaction, $C_2$–$C_6$ alkyl groups, as defined, are converted to derivatives having olefinic unsaturation.

The reaction temperature can range from about 400° C. to about 650° C., with a preferred range of 500–600° C.

The space velocity can range from about 50 to 2500 v./v./hr., preferably 800–1800 v./v./hr.

The molar ratio of oxygen to the $C_2$–$C_6$ alkyl aromatic compound can vary between about 0.5 to about 4.0, preferably 0.5 to 1.5. Oxygen can be supplied as air, commercially pure oxygen or air enriched with oxygen.

The pressure can vary between about 0.5 to about 10 atmospheres. Preferably a pressure of about 1 to 2 atmospheres is employed.

At least one inert diluent is desirable. These include carbon dioxide, nitrogen or the noble gases, with or without steam, or mixtures of such inert gases, with or without steam. They are used in a molar ratio of from 4–20 based on the $C_2$–$C_6$ alkyl aromatic compound undergoing dehydrogenation. When steam is a diluent it is preferred that it be used in admixture with one of the other inert diluents in a steam—other diluent gas volume ratio of about 1 to 1 and most preferably in a ratio of not more than 1 to 1.

Preparation of the catalysts

A solution of 21 g. of 85% Ce $(HSO_4)_4$ in 30 ml. concentrated sulfuric acid and 1250 ml. water was added over a period of about 2½ hours to a solution preheated to 93° C., containing 506 ml. of 85% phosphoric acid in 1250 ml. water. The precipitate was stirred at 103° C. for four hours and allowed to cool. The precipitate was filtered, washed with water until free of sulfates and dried at 110° C.

A coprecipitated cerium-zirconium phosphate was prepared by adding a solution containing 6.6 g. of hydrated zirconium nitrate and 10.5 g. of 85% Ce$(HSO_4)_4$ in 1250 ml. water to a solution of 506 ml. 85% $H_3PO_4$ in 1250 ml. water which was preheated to 93° C. The addition of the cerium-zirconium salt mixture to the phosphoric acid took 1 hour and 35 minutes. The solids were filtered and dried at 110° C.

Each of the catalysts was crushed to 20–40 mesh (U.S.) and heated at 550° C. for one hour.

The reactor was a high silica glass tube 15 mm. I.D. and 45 cm. long, with an inlet for the compound to be dehydrogenated and another for a premixed feed of oxygen and inert gaseous diluent. The effluent from Examples 3 and 7 was passed through two cold traps maintained at 0° and —78° C. Liquid in the cold traps was analyzed by vapor phase chromatography and non-condensed gases were analyzed by mass spectrography. For all other examples the effluent was analyzed before condensation. The olefins and unreacted alkyl aromatic were analyzed in one v.p.c. column and non-condensed gases were analyzed on a silica gel v.p.c. column.

Coarse, high-silica glass chips were added above the catalyst layer to serve as a mixing and preheating area. The reactor was heated by placing it in an electric resistance furnace.

The examples which follow are intended to illustrate, but not to limit the invention. All parts and percentages are mole percentages, unless otherwise indicated.

Example 1

The reactor was loaded with 8 cc. (4.8 g.) of cerium phosphate catalyst. The temperature was adjusted to that desired and a mixture of 123 cc. helium and 10.4 cc. oxygen per minute was fed to the reactor along with 2.95 cc. (liquid) per hour of ethyl benzene. The pressure was slightly above atmospheric (about .5 lb. p.s.i.g.). During the first hour of the run the reaction temperature was 536° C. and in the next hour it was 551° C. Data taken during the test are given below:

| Temperature, °C. | Percent Conversion | | Styrene selectivity |
|---|---|---|---|
| | Ethyl benzene | $O_2$ | |
| 536 | 69.9 | 94.9 | 91.7 |
| | 70.9 | 87.4 | 91.4 |
| 551 | 76.9 | 91.9 | 90.9 |
| | 77.5 | 92.7 | 91.0 |

These data clearly indicate that exceptionally high selectivity to styrene and high conversion per pass are obtained at comparatively low temperatures.

Example 2

In this run of six hours duration, the reaction temperature was held at about 550° C. The catalyst and its amount was that described in the previous example. The helium flow was reduced to 85 cc. per minute, but the oxygen and ethyl benzene feed rates per unit time were the same as reported in Example 1. Samples taken at the beginning of the run, after three hours and after six hours were analyzed and the results obtained are listed below:

| Temperature, °C. | Percent Conversion | | Styrene selectivity |
|---|---|---|---|
| | Ethyl benzene | $O_2$ | |
| Beginning of run | 76.9 | 91.9 | 90.9 |
| Three hours | 74.2 | 96.4 | 90.0 |
| Six hours | 72.3 | 97.7 | 89.1 |

In another run of 21 hours duration, using 6.3 g. of the catalyst of Example 1, and a feed of 10.5 ml. $O_2$, 10.6 ml. ethyl benzene vapor, and 80 ml. helium per minute at STP at a maximum temperature of 536° C. the following results were obtained.

| Time (hours) | Percent Conversion ethyl benzene | Styrene selectivity |
|---|---|---|
| 6.0 | 76.0 | 88.5 |
| 10.5 | 75.3 | 88.0 |
| 15.0 | 73.6 | 87.0 |
| 19.0 | 72.8 | 87.0 |
| 21.0 | 72.5 | 86.9 |

Example 3

This example shows that a variety of monocyclic aromatic compounds have a

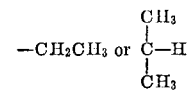

group attached to the ring can be oxydehydrogenated over the catalyst to produce a vinyl aromatic derivative.

The reactor was loaded with 17 g. of cerium phosphate made by the procedure described above. Tabulated below are data obtained in these tests:

| Compound dehydrogenated | Temp., °C. | Feed rates, c.c./min. | | | Organic compound, c.c. liquid/hrs. | Percent | | |
|---|---|---|---|---|---|---|---|---|
| | | | | | | Conversion | | |
| | | O₂ | Argon | Helium | | Organic compound | O₂ | Selectivity |
| Ethyl benzene | 535 | 10 | 50 | 100 | 3 | 77.1 | 93.1 | 91.1 |
| o,p-Chloro ethyl benzene | 537 | 10 | 50 | 100 | 3 | 77.4 | 96.7 | 88.2 |
| p-t-Butyl ethyl benzene | 536 | 10 | 50 | 100 | 3 | 73.3 | 99.6 | 85.1 |
| Ethyl tolune | 537 | 10 | 50 | 100 | 3 | 52.8 | 99.6 | 79.6 |
| Isopropyl benzene | 537 | 10 | 50 | 100 | 3 | 56.7 | 99.7 | 74.2 |

It is apparent that good yields of styrene, chlorostyrene, p-t-butylstyrene, vinyl toluene and cumene (alpha methyl styrene) were obtained.

Example 4

In this example the procedure of Example 1 was followed with the exception that 5.7 g. of coprecipitated cerium-zirconium phosphate catalyst replaced the cerium phosphate. About 50 mole percent of the metal atoms were cerium. The feed rates were 123 cc. helium and 10.4 cc. oxygen per minute and 3.0 cc. liquid ethyl benzene per hour. During the run of about three hours at different temperatures samples were taken at half hour intervals. The results of the analysis of the samples are tabulated below:

| Temperature, °C. | Percent | | |
|---|---|---|---|
| | Conversion | | Styrene selectivity |
| | Ethyl benzene | O₂ | |
| 532 | 61.1 | 86.4 | 88.1 |
| | 61.6 | 84.0 | 87.7 |
| 551 | 65.9 | 95.5 | 87.0 |
| | 65.2 | 96.0 | 86.7 |
| 572 | 68.8 | 99.2 | 86.1 |
| | 68.1 | 99.0 | 86.8 |

Example 5

During a six hour run at 550° C. using the cerium-zirconium catalyst of Example 4, samples were taken at the beginning and at three hour intervals. The amount of helium was reduced to 85 cc. per minute for the entire period of the test. The feed rate of oxygen and ethyl benzene were as described in Example 4. Analysis of the samples gave the following results:

| Temperature, °C. | Percent | | |
|---|---|---|---|
| | Conversion | | Styrene selectivity |
| | Ethyl benzene | O₂ | |
| Beginning of run | 64.9 | 97.0 | 88.1 |
| Three hours | 65.4 | 97.8 | 86.8 |
| Six hours | 64.1 | 98.6 | 86.2 |

Example 6

The catalyst for the run of this example was prepared by evaporating 16.3 g. of $(NH_4)_2Ce(NO_3)_6$ on 18.4 g. of Houdry S–100 aluminum oxide (20–40 mesh, 8.6 m.²/g.) and heating to 400° C. overnight. Then 6.83 g. of 85% phosphoric acid were added to the cooled mixture and heated overnight at 550° C. The catalyst contained about 13% Ce.

The feed consisted of 10.6 ml. oxygen, and 48.6 ml. argon per minute and 2.6 g. ethyl benzene per hour. Data obtained on hourly samples are tabulated below:

| Temperature, °C. | Percent | | |
|---|---|---|---|
| | Conversion | | Styrene selectivity |
| | Ethyl benzene | O₂ | |
| 540 | 53.2 | 50.3 | 93.5 |
| | 55.0 | 55.6 | 93.0 |
| | 58.0 | 61.7 | 91.8 |
| 595 | 77.1 | 95.1 | 89.0 |
| | 77.0 | 96.2 | 88.4 |

It is apparent that other carriers for the catalyst can be employed to give comparable results.

The catalyst for the examples which follow was prepared by adding at a rate of about 12 ml. per minute, a solution of 66.8 g. of $Ce(HSO_4)_4$, 1500 ml. water and 30 ml. concentrated $H_2SO_4$ to a solution of 500 ml. 86.5% $H_3PO_4$ in 1000 ml. of water, at a temperature of 91–92° C. Thereafter the temperature was raised to 102–113° C. and held for about 18 hours. The mixture was cooled, filtered and washed with water until free of sulfates. The cerium phosphate was then dried at about 95° C. and then heated overnight at 550° C. The so treated catalyst was then crushed and screened, and the 20–40 mesh particles were used.

Example 7

The catalyst bed contained 4.5 g. (10 ml.) of the above described catalyst. The feed consisted of 100 ml. helium, 24 ml. argon and 11.5 ml. oxygen per minute and variable amounts of several different alkyl aromatic compounds. Results obtained are tabulated below.

| Temp., °C. | Alkyl aromatic in feed | Mmole/hr. | Mmole/hr., aromatic olefin | Percent | |
|---|---|---|---|---|---|
| | | | | Conversion | Selectivity |
| 550 | Ethylbenzene | 27.17 | 17.41 (styrene) | 70.5 | 90.9 |
| 545 | Ethylnapthalene | 21.50 | 15.20 (vinyl naphthalene) | 78.3 | 90.3 |
| 531 | m-Diethylbenzene | 25.67 | 10.29 (vinyl ethylbenzene) | ¹ 62.2 | 64.5 |
| | | | 3.88 (divinylbenzene) | | 24.3 |
| 550 | n-Butylbenzene | 21.21 | .8 (cis-1-phenyl butene-1) | ¹ 51.2 | 7.3 |
| | | | 2.19 (trans-1-phenyl butene-1) | | 20.2 |
| | | | 3.42 (1-phenyl butadiene-1,3) | | 31.5 |
| | | | 2.83 (naphthalene) | | 26.0 |
| 555 | 2-ethyl pyridine | 29.33 | 6.12 (2-vinyl pyridine) | 31.1 | 67.1 |

¹ Total conversion of m-diethylbenzene and n-butylbenzene.

The ethyl naphthalene feed was a mixture of 1- and 2-isomers. There was no evidence of

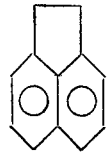

in the effluent by I.R. spectroscopy.

Example 8

For the runs of this example 3.9 g. of an unsupported cerium phosphate catalyst having a surface area of 27.7 square meters per gram were loaded into the reactor.

The feed initially consisted of 10.6 ml. oxygen, 50.6 ml. argon and about 100 ml. helium per minute. Ethyl benzene was fed as a vapor at a rate of 2.65 g. per hour. During a portion of the run the temperature was varied. After about three hours, the helium was replaced with carbon dioxide, at a rate of 97.3 ml. per minute, as a diluent gas. Data obtained in these tests are tabulated below:

HELIUM AND ARGON AS DILUENTS

| Temperature, C° | Percent Conversion | | Styrene selectivity |
|---|---|---|---|
| | Ethyl benzene | $O_2$ | |
| 502 | 49.6 | 57.6 | 92.5 |
| 550 | 69.9 | 87.0 | 90.6 |
| 597 | 76.5 | 99.7 | 89.0 |
| 596 | 71.6 | 99.8 | 87.3 |
| 596 | 69.7 | 99.9 | 86.6 |
| 595 | 65.6 | 99.9 | 87.2 |
| Helium replaced by 97.3 ml./min. $CO_2$ | | | |
| 595 | 82.4 | 98.2 | 89.1 |
| 595 | 77.3 | 98.5 | 86.9 |
| 595 | 68.1 | 99.7 | 85.6 |

For comparative purposes zirconium phosphate was prepared by adding a solution of 13.2 g. $ZrO(NO_3)_2$ hydrate in 1250 ml. $H_2O$ and 30 ml. of concentrated $H_2SO_4$ to a solution of 506 ml. $H_3PO_4$ in 1250 ml. water, preheated to 93° C. The zirconium salt solution was added to the phosphoric acid solution over a one hour and 35 minute period. The precipitate was washed, dried and crushed to 20–40 mesh. Then the zirconium phosphate was heated to about 550° C. for about one hour. A 6.92 g. (8 cc.) charge of zirconium phosphate was placed in the reactor. The feed contained 123 cc. helium and 10.4 cc. oxygen per minute. Ethyl benzene was fed at a rate of 2.93 cc. (liquid) per hour. Analytical data on samples taken at half hour intervals are tabulated below:

| Temperature, C° | Percent Conversion | | Styrene selectivity |
|---|---|---|---|
| | Ethyl benzene | $O_2$ | |
| 526 | 24.9 | 27.8 | 92.2 |
| | 26.4 | 30.7 | 91.6 |
| 552 | 34.2 | 46.2 | 88.7 |
| | 34.5 | 46.6 | 88.4 |
| 585 | 42.9 | 66.5 | 84.3 |
| | 42.4 | 67.0 | 83.9 |

In a six hour run with zirconium phosphate in which the helium flow was reduced to 85 cc. per minute and the temperature was held at 550° C. the following analytical results were obtained:

| Time | Percent Conversion | | Styrene selectivity |
|---|---|---|---|
| | Ethyl benzene | $O_2$ | |
| Beginning | 34.6 | 47.4 | 88.8 |
| Three hours | 36.9 | 53.7 | 86.8 |
| Six hours | 37.4 | 54.8 | 86.9 |

These data show that cerium phosphate and coprecipitate cerium-zirconium phosphate have catalytic properties for oxydehydrogenation of $C_2$–$C_3$ alkyl aromatic compounds which are very superior to zirconium phosphate.

In another comparative test with cerium oxide as the catalyst under conditions described in Example 3, the ethyl benzene conversion was 34.6%, oxygen conversion was 99.7%, and selectivity to styrene was 52.0%. At 554° C., the ethyl benzene conversion was 43.5%, oxygen conversion was 99.8%, and selectivity to styrene was 53.1%.

The aromatic compounds having a $C_2$–$C_3$ olefinic group or a $C_4$–$C_6$ conjugated diene group can be homopolymerized to form high molecular weight polymers which are useful for making sheets, tubes and molded or extruded articles of various types. The aromatic compounds with $C_4$–$C_6$ monoolefinic unsaturation can be copolymerized with a wide variety of other olefinic monomers including the above $C_2$–$C_3$ monoolefins to provide resins which can be formed into sheets, tubes, or other articles by molding or extruding.

We claim:

1. A method of preparing an olefinically unsaturated compound from alkyl aromatic compound comprising reacting a mixture of from about 0.5 to about 4 moles of oxygen per mole of an aromatic compound of the structure $(R_1)_x Ar(R)_n$, wherein $n$ is an integer from 1 to 3, inclusive, R is a $C_2$–$C_6$ alkyl group with at least one H atom on the alkyl carbon atom attached to an aromatic group, Ar is a mono or bicyclic aromatic hydrocarbon group or pyridine, $R_1$ represents —$CH_3$, a halogen atom, CN, or —$C(CH_3)_3$ and $x$ is an integer from 0 to 9 in the presence of a catalyst comprising cerium phosphate or a solid solution or a coprecipitate of cerium and zirconium phosphates in which the molar content of the cerium moiety is at least 50% or a mixture of said cerium phosphate and said solid solution of or coprecipitate of cerium and zirconium phosphates at a temperature of from about 450° C. to about 650° C.

2. The process of claim 1 in which the oxygen is supplied as air.

3. The process of claim 1 in which the amount of oxygen per mole of said alkyl aromatic compound ranges from about 0.5 to about 1.5.

4. The process of claim 1 in which at least one of carbon dioxide, nitrogen or a noble gas is added to the reaction feed mixture.

5. The process of claim 1 in which $(R_1)_x Ar(R)_n$ is ethyl benzene.

6. The process of claim 1 in which $(R_1)_x Ar(R)_n$ is isopropyl benzene.

7. The process of claim 1 in which $(R_1)_x Ar(R)_n$ is chloroethyl benzene.

8. The process of claim 1 in which $(R_1)_x Ar(R)_n$ is p-t-butyl ethyl benzene.

9. The process of claim 1 in which $(R_1)_x Ar(R)_n$ is ethyl toluene.

10. The process of claim 1 in which $(R_1)_x Ar(R)_n$ is ethyl pyridine.

11. The process of claim 1 in which $(R_1)_x Ar(R)_n$ is ethyl naphthalene.

12. The process of claim 1 in which $(R_1)_x Ar(R)_n$ is n-butyl benzene.

13. The process of claim 1 in which the catalyst is cerium phosphate.

14. The process of claim 1 in which the catalyst is a coprecipitate of cerium and zirconium phosphates in which the cerium moiety is at least 50 mole percent.

15. The process of claim 7 in which the catalyst is cerium phosphate.

16. The process of claim 8 in which the catalyst is cerium phosphate.

17. The process of claim 1 in which $(R_1)_x Ar(R)_n$ is diethyl benzene and the reactor effluent contains a mixture of divinyl benzene and ethyl styrene.

References Cited

UNITED STATES PATENTS 3,320,329    5/1967    Nolan _____ 260—290

HARRY I. MOATZ, Primary Examiner

U.S. Cl. X.R.

260—294.9, 465 G, 465 K, 649 R, 649 F, 649 DF, 650 R, 650 F, 669 R; 252—437; 423—21